United States Patent [19]
Holliday

[11] 3,980,401
[45] Sept. 14, 1976

[54] MICROFORM INFORMATION STORAGE ARRANGEMENT

[75] Inventor: Robert G. Holliday, Ann Arbor, Mich.

[73] Assignee: Xerox Corporation, Stamford, Conn.

[22] Filed: Jan. 8, 1975

[21] Appl. No.: 539,382

Related U.S. Application Data

[60] Division of Ser. No. 388,528, Aug. 15, 1973, abandoned, which is a continuation of Ser. No. 199,689, Nov. 17, 1971, abandoned.

[52] U.S. Cl. .............................. 353/27 A; 353/120; 40/106.1
[51] Int. Cl.² ........................................ G03B 23/08
[58] Field of Search ............. 235/61.12 R, 61.12 N; 40/158 B, 159, 106.1, 63 A, 63 B; 353/25, 26, 27, 120

[56] References Cited
UNITED STATES PATENTS

| | | | |
|---|---|---|---|
| 575,865 | 1/1897 | Webber et al. | 282/8 B |
| 1,838,325 | 12/1931 | Phillips | 282/10 |
| 3,322,027 | 5/1967 | Forbes et al. | 353/25 |

OTHER PUBLICATIONS

Rogondino, "Visual Projection System," IBM Technical Disclosure Bulletin, vol. 9, No. 12, p. 1778 May 1967.

*Primary Examiner*—Thomas J. Sloyan

[57] ABSTRACT

A microform information storage unit for use with a microform reading apparatus is disclosed. The unit comprises a plurality of microform information storage members pivotally coupled along a common edge of a first body and a plurality of index members integrally coupled with the microform storage members in predetermined alignment with the microform members, the index members being integrally coupled along a common edge to an opposite edge of the first body whereby the index members and the microform members are adapted to be folded along the coupling edges. The index members have recorded thereon indicia for randomly retrieving information from the microform members when the indicia are aligned with reference means of the reading apparatus.

3 Claims, 27 Drawing Figures

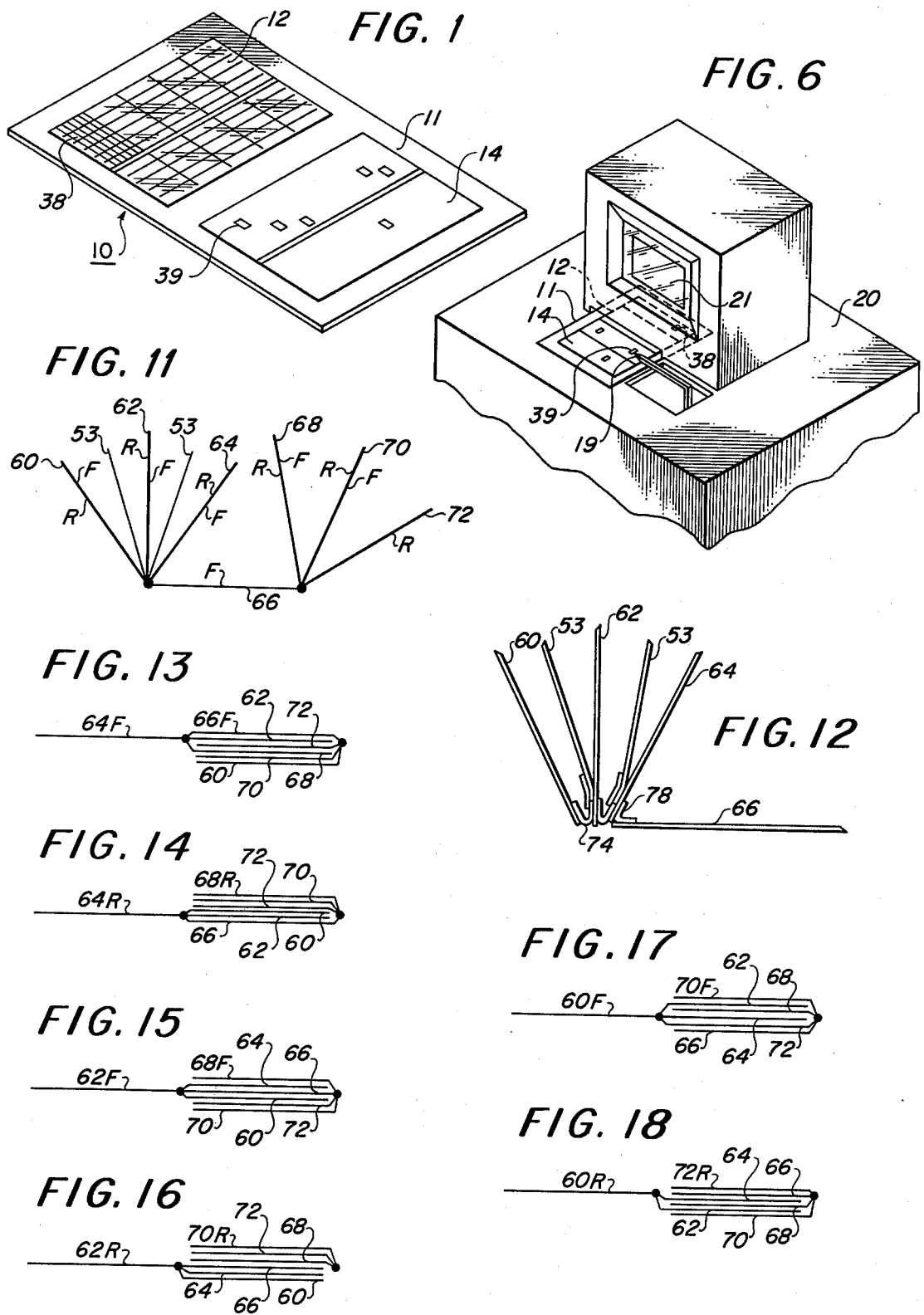

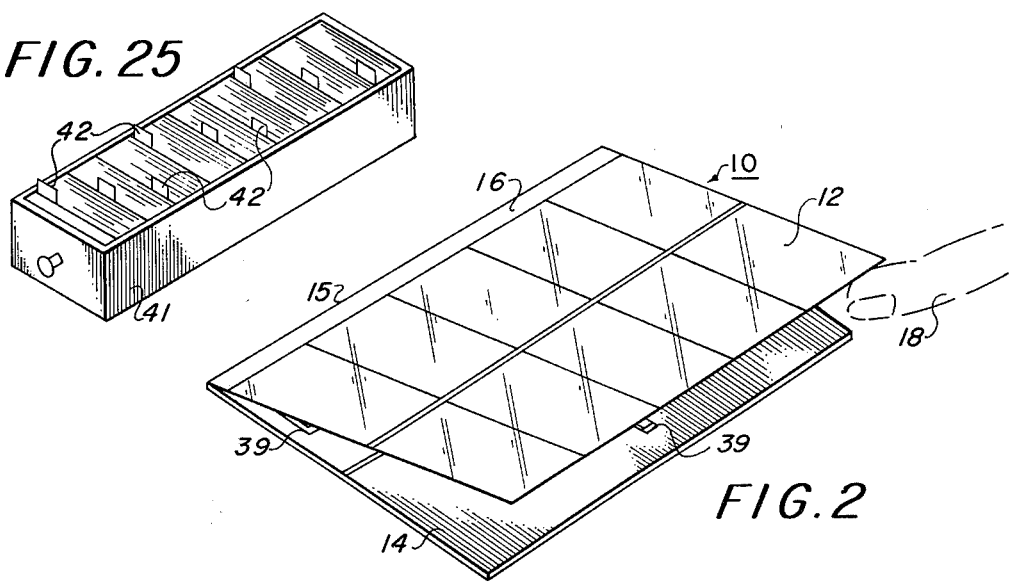
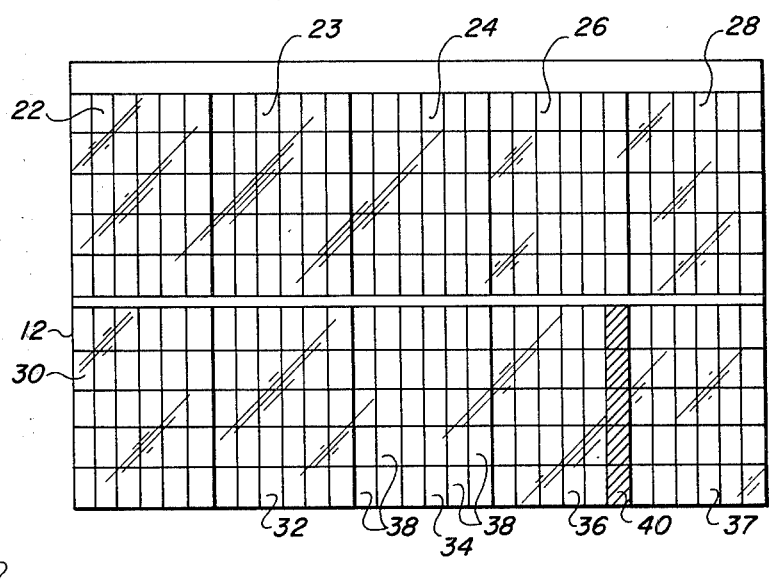
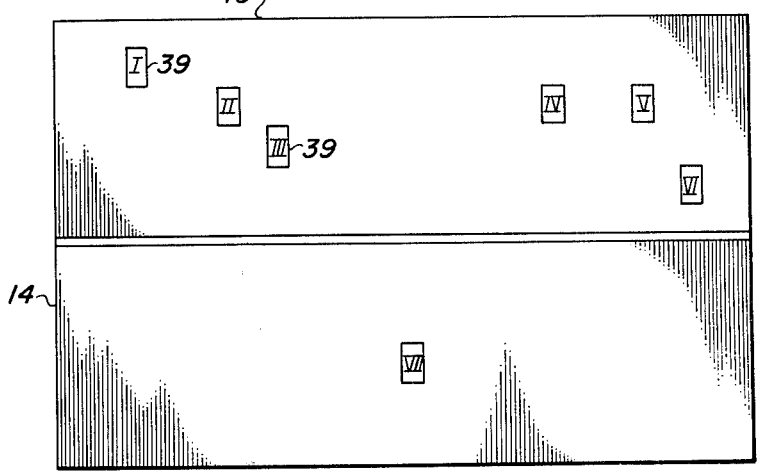

MICROFORM INFORMATION STORAGE ARRANGEMENT

This application is a division of application Serial No. 388,528, filed Aug. 15, 1973, and now abandoned, which was a continuation of application Ser. No. 199,689, filed Nov. 17, 1971, and now abandoned.

This invention relates to microform information storage arrangements. The invention relates more particularly to an improved microform information storage arrangement and to means for facilitating the retrieval of information from a microform storage arrangement.

Various microform information storage arrangements have been employed which have reduced the storage space requirements for relatively large bodies of information. These arrangements employ a plurality of information elements which are photographically recorded in a rectangular array for example on a sheet of film material. Alternatively, the plurality of information elements are recorded on film strips which are mounted on cards for handling and storage.

Information stored on a microform is retrieved by entering the microform into a reading apparatus which is adapted for magnifying and displaying the information. The desired information is displayed by orientating an information element with respect to a reference means at the apparatus thereby aligning the information element with the optical projection means of the apparatus. In one projection system, the microform is moved with respect to an index pointer for achieving this alignment while in another known projection system the microform is maintained stationary and the position of an optical element is altered in order to achieve the desired alignment.

While these microform storage arrangements have reduced the storage volume requirements for large bodies of information, they do not fully satisy the increasing need for relatively rapid retrieval of information stored on microforms. In general, information is stored on a microform by simultaneously recording a large number of information elements or by sequentially recording the information elements in the order in which they are received from an information source. Information is then retrieved from the microforms by spot scanning the information elements or by scanning the elements in the sequence of recording until the desired information element is located and displayed. With this technique, the searcher is undesirably required at times to scan through large bodies of stored information before the desired information element can be found. In one type of microform, a strip of microform sheet contains suitable indicia such as subject title or other identification information which distinguishes a particular microform information unit from other microform information units. However, this indicia does not provide for reducing the access time in locating an information element recorded on the microform. The need therefore exists for the random retrieval of information stored on a microform. This is particularly true in the case of reference texts, scientific journals, engineering notebooks of industrial organizations and other bodies of information which can include a large quantity of unrelated data.

Accordingly, it is an object of this invention to provide an improved microform information storage arrangement.

Another object of the invention is to provide a microform information storage arrangement adapted for providing random retrieval of information stored on a microform.

Another object of the invention is to provide a microform information storage unit having means for facilitating the location of particular information stored by the unit.

A further object of the invention is to provide means for entering a relatively large body of information stored on a microform at the storage location of information which is to be retrieved.

Another object of the invention is to provide means for enhancing the retrieval of information from a microform storage system wherein the recorded information is stored on a microform information storage unit having two or more microform members.

Another object of the invention is to provide a random access microform information storage arrangement having an information storage unit which is adapted for the supplemention and amendment of stored information.

Another object of the invention is to provide a random access microform information storage arrangement which can be employed with forward and rearward image projection microform reading apparatus.

A further object of the invention is to provide a random access microform information storage arrangement having an information storage unit which is relatively compact and can be readily filed and retrieved from storage.

Still another object of the invention is to provide a relatively compact microform information storage unit having a plurality of integral microform information storage members and a plurality of integral indexing members each of which is associated with a microform member.

Another object of the invention is to provide a microform information storage unit having a plurality of integral microform information storage members and a plurality of integral index members each associated with a specific member for use with forward and rearward image projection reading apparatus.

Another object of the invention is to provide a microform information storage unit having microform information storage members and associated microform indexing members arranged in a book format.

In accordance with the general features of the present invention, an information storage arrangement is provided comprising a microform information storage unit which is adapted to be positioned in a microform reading apparatus for the random retrieval of information. An information storage unit comprises an integral, generally planar-shaped microform information storage member and an integral, generally planar-shaped information index member which is maintained in predetermined alignment with the microform member when the unit is positioned at a reading station of a reading apparatus. The microform information storage member includes an array of information elements which are recorded thereon and which are adapted to be magnified and displayed by a reading apparatus. The index member includes index elements which are recorded thereon and which are positioned in predetermined spatial relationship with respect to associated information storage elements of the microform member for use in cooperation with reference means of the reading apparatus for randomly locating and displaying information stored on the microform member. Display of a desired microform information element is effected by aligning an index element which is associated with the information element which is to be retrieved with the reference means of the reading apparatus. This alignment can be accomplished in one form of reading apparatus having a stationary optical projection means by positioning the microform information unit with respect to the stationary reference means. In a reading apparatus of the type having a movable optical projection means, the information storage unit is maintained stationary and the reference means is positioned with respect to the index element of interest. The user is thus provided with the advantageous facility for directly entering the microform information member at the location of stored information which is to be retrieved.

In accordance with one embodiment of the invention, the microform information storage unit comprises a self-supporting sheet of material which includes the information and index members integrally formed thereon. In accordance with an alternative embodiment of the invention, the index member is integrally and flexibly intercoupled with the microform member along the edges of these members. The flexible coupling provides for the folding of the information storage unit thereby resulting in juxtapositioning of surfaces of the members and reduction in the size of the unit for storage. During information retrieval, the flexibly coupled members are unfolded into the same plane and are positioned on the surface of the reading apparatus for magnification and display of desired elements of the microform.

In accordance with other features of the invention, an information storage unit includes a plurality of integral microform information storage members and a plurality of integral indexing members each of which is associated with a microform member. In one arrangement, the index members are flexibly intercoupled in a book like format with the microform members while in another arrangement the index members are intercoupled in a pleated arrangement for convenience in folding. The index members are arranged to provide for use of the information unit with both forward and rearward image projection reading apparatus.

Further particular features of the invention provide means for amending or supplementing information both in the microform member and in the associated index member.

These and other objects and features of the invention will become apparent with reference to the following specification and to the drawings wherein:

FIG. 1 is a perspective view of one embodiment of a microform information storage unit constructed in accordance with features of this invention;

FIG. 2 is a perspective view of an alternative embodiment of a microform information storage unit constructed in accordance with features of this invention;

FIG. 3 is a plan view of a microform member of the information storage unit of FIGS. 1 and 2 and illustrating one form of arrangement of information on the microform;

FIG. 4 is a plan view of an index member of the information storage unit of FIGS. 1 and 2;

FIG. 6 is a perspective view of a reading apparatus and an information storage unit positioned thereon for magnification and display;

FIG. 11 is a side elevation schematic view of another embodiment of a microform information storage unit constructed in accordance with features of the invention and adapted for use with forward and rearward image projection reading apparatus;

FIG. 12 is an enlarged partial view of the information storage unit of FIG. 11 illustrating the integral mounting of microform members to the unit;

FIGS. 13 through 18 are side elevation schematic views of the information storage unit of FIG. 11 illustrating the microform index members in various folded over positions for use in forward and rearward image projection apparatus;

FIG. 25 is a perspective view of a storage means for storing a large number of information storage units;

Figure 5:
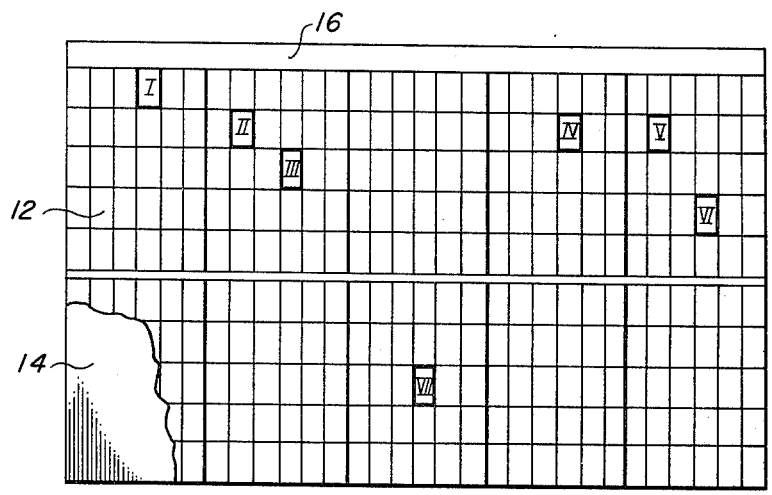
FIG. 5 is a plan view of the microform information storage unit of FIG. 2 illustrating the unit in a folded position for storage.

Referring now to the drawings and particularly to FIG. 1, a microform information storage unit which is referenced generally as 10 is shown to comprise in one embodiment of the invention a self-supporting sheet of material 11 having a microform information storage member 12 and an index member 14. Although not necessary to the practice of the invention, the microform index bodies are shown to correspond generally in size and in geometrical configuration. These members are shown in the drawings to have generally rectangular configurations. The sheet 11 comprises, for example, a relatively thick, self-supporting film upon which the microform index members are formed by photographic techniques. A sheet 11 is formed for example of cellulose acetate or a polyester such as Mylar of about 0.035 inches thickness which is coated with a light sensitive emulsion, exposed to light in the presence of photoreduced information and in the presence of index information, and is then developed. Alternatively, the sheet 11 is formed by sandwiching the microform and index members between transparent surface layers of polystyrene, for example, which are laminated into a self-supporting sheet by the application of heat and pressure thereto. In this case, the microform member comprises a developed film of photosensitized cellulose acetate or polyester as described above while the index member is similarly formed or is fabricated of transparent film, paper or of cardboard. In a further arrangement, a microform member is fabricated of a developed film of photosensitized cellulose acetate or Mylar and and index member is similarly formed for is formed of cardboard, paper or other convenient material for recording index information. These members are mounted and secured by an adhesive or other binding means in predetermined alignment on a surface of a sheet of self-supporting transparent material such as polystyrene. A sheet 11 formed in accordance with either of these alternative arrangements is self-supporting and maintains the microform and index members in an initially established predetermined alignment in a same plane.

A microform member includes a plurality of information elements 38 and an index member includes a plurality of associated index elements 39. These elements are described in greater detail hereinafter. The information and index members are positioned in predetermined alignment by locating the information and index elements on their respective members and by spacing the members with relation to each other by a distance which provides alignment of an index element with a reference means at a reading apparatus. Such positioning simultaneously aligns the associated information element with the optical projection means of the apparatus. This spacing will depend on the distance between the reference means and the projection means at the reading apparatus. FIG. 6 illustrates the alignment of an indexing element 39 with a reference means 19 at a reading apparatus 20 for effecting the projection and display of an associated information element 38 by the reading apparatus. In one form of reading apparatus, the sheet 11 is moved about the surface of the apparatus at the reading station while the index member associated with an information element 38 which is to be displayed is positioned in alignment with the reference means 19 shown to comprise an index pointer. In another form of reading apparatus, the sheet 11 is positioned between stationary guides and the reference pointer 19 is altered in position and correspondingly alters the position of projection optics of the apparatus for projecting and displaying the associated information element 38.

In accordance with an alternative embodiment of the information storage unit 10 of this invention as illustrated in FIG. 2, the microform member 12 and index member 14 are integrally and flexibly intercoupled in predetermined alignment. The microform member 12 is shown in FIG. 2 to be pivotally coupled to the index member 14 along a portion of its perimeter near an edge 15. Alternatively, the microform and index members may each be mounted to support sheets, not shown, which sheets may be pivotally coupled or the members can be mounted to a single sheet which is adapted to be folded so that the members are juxtapositioned when the sheet is folded. The arrangement of FIG. 2 illustrates intercoupling of the members by a strip of suitable adhesive tape 16 such as, for example, polyethylene terephthalate or cellulose acetate tape. These members can also be intercoupled by a suitable adhesive or other appropriate material.

Figure 7:
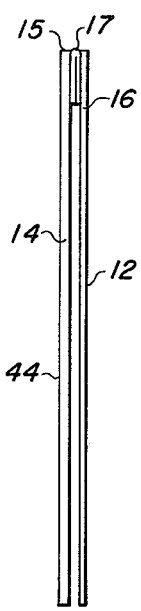
FIG. 7 is a side elevational view of the information storage unit of FIG. 2.

Pivotal coupling near edges of the members provides for folding of the members and juxtapositioning of their surfaces. The members of an information storage unit can thus be folded over for compact storage. The folded storage unit can be readily identified in storage, retrieved, and unfolded at the reading apparatus. More particularly, the microform member and index member can be pivoted along a crease 17 (FIG. 7) in the tape and unfolded on a flat surface of the reading apparatus 20 (FIG. 6). In FIG. 2, the microform member 12 is shown partially displaced from the index member 14 and is held in this partially unfolded position by the user's finger 18. When the user's finger releases the microform member 12, it will fold to a juxtapositional relationship with the index member 14 for storage.

A large quantity of intelligence can be stored on a microform information storage unit 10. An index member is intercoupled with the microform member in predetermined alignment and includes recorded index elements 39 positioned at locations thereon which are keyed to the locations of information elements 38 on the microform. The recorded index information on the index member is viewable by the unaided eye of the user who then aligns this index information with the reference means 19 of the reading apparatus 20 (FIG. 6) for magnifying and displaying the desired information on the viewing screen 21. The information storage unit 10 of FIG. 2 is unfolded and positioned on the flat surface of the reading apparatus 20 (FIG. 6) and the reference means 19 which comprises the index pointer is moved into alignment with respect to and index member 14 until the pointer coincides with a recorded index element 39 on this member. The associated information element 38 stored on the microform will then be displayed on the screen 21.

Figure 26:
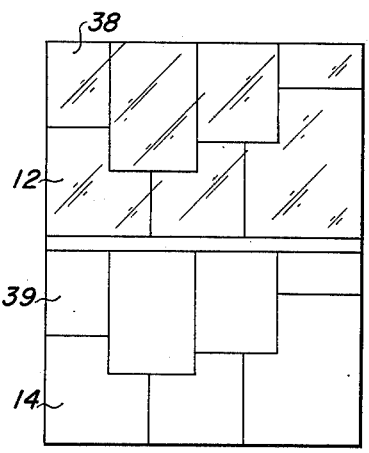
FIG. 26 is a plan view of an embodiment of an information storage unit of the invention illustrating irregular configuration of information storage elements and corresponding index elements.

In one exemplary arrangement, the microform member 12 includes stored information such as a reference text which is photoreduced and fixed at information locations 22 through 37 as illustrated in FIG. 3. FIG. 3 is an enlarged plan view of a microform member 12 illustrating one arrangement of a plurality of information locations. Single pages of the text are photoreduced as illustrated by the information elements 38 of location 34. The index member 14 includes indicia located on a surface thereof which directs the searcher to a particular information element 38 of interest. The indicia is formed by photographic techniques, by printing or by scribing on the index member 14 at locations in predetermined alignment with information elements of interest on the microform member 12. For example, in FIGS. 2, 3, 4, and 5, it is presumed that a 300 page text is stored on the microform member 12 and that the user is desirous of randomly entering the text at the beginning of any of its seven chapters and wishes to do this directly rather than sequentially scan through the chapters until the desired chapter is reached. The Roman numerals formed on the index member 14 of FIG. 4 represent chapter numbers, and their locations are indicative of the location of information elements 38 on the microform member 12 at which the first page in the associated chapter is found. Thus, the location on a microform of particular information in a large body of information can be selected randomly and information retrieval is greatly facilitated. Although a text was presumed to be recorded on the microform in the above example, other bodies of information can just as readily be stored and retrieved in the same manner from a same microform member. Further the information elements on a microform member may assume irregular configuration as illustrated in FIG. 26 and the index elements have corresponding irregular configurations. This feature is particularly useful in inventory information storage and cataloging.

Various means for establishing indicia on an index member 14 for locating information on a microform member 12 can be employed. The surface of an index member 14 can include a lined grid structure which simulates a lined grid of the microform member 12 as illustrated in FIG. 5. The searcher can then relate the location of the indicia to the grid location of the information elements. In addition to forming the indicia on the surface 14, other information, nomenclature and symbols such as arrowheads and the like for establishing indicia can equally well be employed. Information can be supplied by handwriting, typing or other methods of printing. In one particularly advantageous arrangement, one side of the index member 14 has recorded thereon information relating to the general body of information stored on the microform as for example, the general subject classification, the title of the work, the author's name, and the Library of Congress classification number. The opposite side of the index member includes a more detailed index for locating the information on the microform. The microform itself can further include in the body of information, an area such as the strip 40 of location 36 in FIG. 3 which contains a subindex. This subindex is photoreduced in the same manner as an information element 38 and can be located by an associated index element 39 recorded on the index member. This indexing technique is particularly advantageous for the storage and retrieval of cataloged merchandise such as small automotive components, etc.

A large number of information storage units 10 can be positioned in a storage receptacle 41 (FIG. 25) thereby providing storage for a relatively large body of information in a relatively small volume of space. Indexing cards 42 can be provided, as is provided in a conventional library indexing system, for separating the microform information storage units 10 according to the subject or other classifications. The microform information storage units 10 are retrievable from the storage unit 41 and in further facilitating this end, the index card 14 has recorded on an opposite surface thereof various classification indicia as has been indicated hereinbefore. The user can then readily retrieve a microform unit 10, unfold the unit of a flexibly coupled embodiment of this unit for providing that each of its members extends in predetermined alignment, place the unit on a surface at a reading station in a reading apparatus adapted for receiving the microform unit, align the apparatus reference mark, pointer or light beam with the index card member, and project a desired information element 38 onto a viewing screen 21 for display and retrieval of the information by the user. Upon viewing the information subindex element 39 reveals the identification of other storage units which may be of interest to the viewer such as in the way of more detailed information on the same subject or associated information. The revealed storage units can be easily retrieved from storage receptacle 41 in the same manner as the initial storage unit was selected.

Various types of microform reading apparatus are known in the art and are commercially available. These readers may be classified variously as readers having forward or rear image projection optical systems. In accordance with a feature of this invention the information storage unit 10 can be employed with either type of reader. The index information of the unit is printed twice for each associated microform and the direction or orientation of each index print is conformed to each type of reader. Thus, the same microform can be employed in both types of readers with two different associated indices in accordance with this invention by orienting the index information so as to be right reading at the reading apparatus when the microform is in the reading position. One skilled in the art can predetermine the proper orientation of the index information having in mind the microform reading apparatus to be employed in conjunction therewith. Normally a transparency microform is employed in both types of readers by inversion of the microform and insertion in the reader in opposite orientation for each type system. The direction of index elements is placed accordingly.

Figure 9:
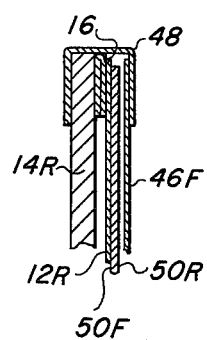
FIG. 9 is an enlarged view illustrating one embodiment for integrally mounting the microform members of FIG. 8 to the microform storage information unit.
Figure 8:
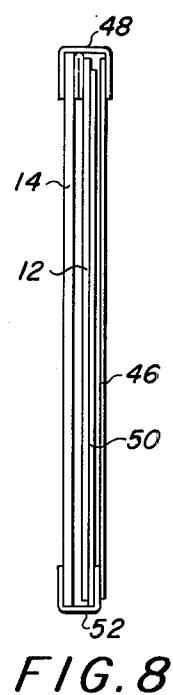
FIG. 8 is a side elevational view of an alternative embodiment of a microform information storage unit having a plurality of microform members and a plurality of index members constructed in accordance with features of this invention.
Figure 10:
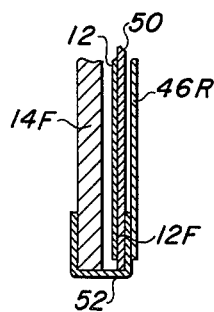
FIG. 10 is an enlarged view illustrating one embodiment for integrally mounting an index member to the information storage unit of FIG. 8.

At times the text or other body of information which is to be stored by an information unit 10 will exceed the storage capacity of a single microform member 12. Under these circumstances, and in accordance with a feature of this invention, a plurality of microform members are provided and are flexibly intercoupled in predetermined alignment with a plurality of associated indexing member. FIG. 8 illustrates a microform information storage unit 10 having a first microform member 12 and a second microform member 46 and associated indexing members 14 and 50. The microform member 46 is pivotally mounted to the indexing member 14 by an adhesive tape which extends over the outer front surface of the microform member 46 (FIG. 9) and over the outer surface of the index member 14. The microform member 46 can therefore be pivoted about the edge of the index member 14 in the same manner as the microform member 12 which is also pivotally tape coupled to this member 14. The second indexing member 50 is supported from a second edge of the index member 14 (FIG. 10) by an adhesive tape 52. This tape 52 extends over a outer surface near the edge of index member 14 and over an outer surface near an edge of the index member 50. The index member 50 interleaves with the microform members 12 and 46. During information retrieval, the information unit is unfolded to provide that microform members and index members extend in predetermined alignment. Index element groups are located on the index members so as to be exposed in the same plane as their associated information element groups upon the unfolding of the storage unit.

The procedure for unfolding the members of the information storage unit for providing that associated microform and index members extend in predetermined alignment will become clear from the following discussion. In order that the information storage unit of FIG. 8 be useful for information retrieval with both a forward and rearward type of reading apparatus, the microform member which is to be read is orientated with an index member by unfolding these members until the microform member and index member are aligned as a two member storage unit in a same plane. The members of the storage unit can be interfolded in order to provide this desired association between the microform member and an index member in accordance with the desired type of projection apparatus being utilized. Table I below lists the microform member and an associated index member which are folded into the same plane.

TABLE I

| Microform Member Surface | 12F | 12R | 46F | 46R |
| Index Member Surface | 50F | 14F | 14R | 50R |

The unfolded unit with members arranged in predetermined alignment in generally the same plant is then positioned at a surface of the reading station of a reading apparatus as described hereinbefore for retrieval of information.

Figure 20:
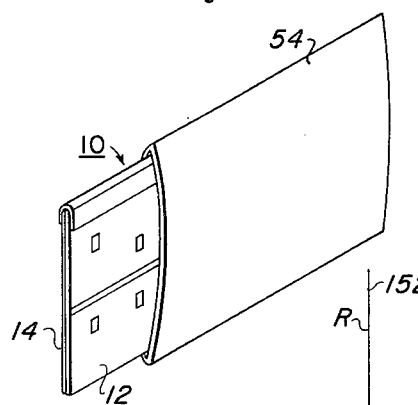
FIG. 20 is a perspective view illustrating the positioning of the storage unit of FIG. 19 in a protective storage jacket.

The microform and index members can be pivotally mounted on various edges of the index member 14 in order to provide the desired interleaving effect. Additionally, a protective sheet of tissue or other suitable material as illustrated by the sheets 53 of FIG. 11 are mounted to the information unit by a suitable adhesive in order to protect the microform members from damage due to scratches and other abrasive contact which can result during handling. An information unit 10 can be further protected by insertion in a storage jacket 54 as illustrated in FIG. 20. The jacket may be formed of a plastic material, cardboard, paper or other suitable material. An outer surface of the jacket has recorded thereon classification data identifying the information unit 10 which is contained therein.

The microform information storage unit of FIG. 11 includes a plurality of microform members and associated index members for providing relatively large storage capacity. The unit comprises microform members 60, 62 and 64 which are pivotally mounted along one edge of an index member 66 and index members 68, 70 and 72 which are pivotally mounted along an opposite edge of the index member 66. The microform members and index members which are pivotally mounted are adapted to be folded in clockwise and counterclockwise directions to provide various configurations as illustrated in FIGS. 13 through 18 wherein a microform member and an associated index member will be positioned in predetermined alignment for reading by a reading apparatus. A means for providing this intercoupling is illustrated in the enlarged view of FIG. 12 wherein the microforms 60 and 62 are shown flexibly intercoupled by a strip of tape 74, the microform 62 and 64 are shown intercoupled by a strip of tape 76 and the microform 64 and the index member 66 are shown intercoupled by a strip of tape 78. In addition, the protective tissues 53 are secured to the microforms 62 and 64 by an adhesive at an inner edge thereof.

Each of the microforms includes a surface termed the "forward" surface and a surface termed the "rearward" surface. Similarly, the index members 68 and 70 each include a surface referred to as the forward surface and a surface referred to as the rearward surface while the index member 66 includes a surface termed the forward surface and the index member 72 includes a surface termed the rearward surface. When information is to be retrieved from the microform in a reading apparatus having a forward image projection optical system, the forward surface of the microform is placed in a level plane to expose the proper surface for projection. Similarly, then the same microform is to be employed with a reading apparatus having a rearward image optical projection system, the rear surface of the microform is positioned in a plane to expose the proper surface for projection. The index member associated with the rear or forward surface of the microform is also positioned in a level plane at the reading station and is properly orientated for viewing by the user by bringing into alignment the desired index element for projection of the desired information element. The following Table II illustrates the correlation between the surface of microform members in FIG. 11 and the surface of associated index members.

TABLE II

| Microform Members | 60F | 60R | 62F | 62R | 64F | 64R |
| Index Member | 70F | 72R | 68F | 70R | 66F | 68R |

By rotating the various microform and index members about their pivotal points, each microform member and its associated index member for a forward or reverse type projection apparatus may be properly aligned in a plane for viewing. FIGS. 13 through 18 illustrate the positioning of these members for viewing each of the microforms in forward and rearward projection apparatus. FIGS. 13, 15 and 17 illustrate the positioning of the microform members for viewing the microform members 64, 62, and 60, respectively in a forward projection type reading apparatus. FIGS. 14, 16 and 18 illustrate the positioning of the microform members and the associated index members for viewing the microform member in rearward projection apparatus. Thus, a large body of information can be stored on a single microform information unit as illustrated in FIG. 11 and the information may be retrieved randomly in accordance with this invention in both a forward projecting and a rearward projecting reading apparatus.

Figure 19:
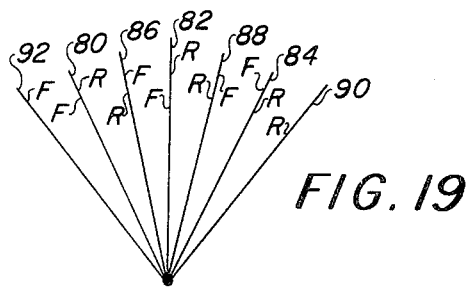
FIG. 19 is a side elevation schematic view of an alternative embodiment of the information storage unit of this invention having a plurality of microform members arranged in a book-like format.
Figure 27:
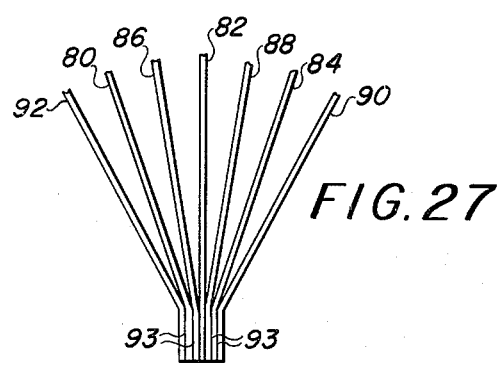
FIG. 27 is an enlarged view of the book-format information storage unit of FIG. 19 illustrating one binding arrangement.

An alternative embodiment of a microform information unit in accordance with the invention having a plurality of microform members and associated index members and which is adapted for use with both forward and rearward projection type reading apparatus is illustrated in FIG. 19. In this arrangement, the microform members 80, 82, and 84 and index members 86, 88, 90 and 92 are coupled along a same adjacent edge in a book-like format. Various means can be employed to provide this integral coupling such as the taped coupling of FIG. 12 and other known binding techniques which will permit pivoting of the microform and index members into predetermined alignment in a same plane. FIG. 27 is an enlarged view of the edge coupling of the members of FIG. 19. The members are shown coupling along adjacent edges by an adhesive 93. This binding can be supplied in a manner well known in the book-binding arts. Each of the microform members is shown to have a forward and rearward surface as discussed hereinbefore with respect to FIG. 11. The associated index member is directly adjacent the microform member and the assembly need only be folded so that the adjacent microform and index members lay in the same plane. The index members 90 and 92 further serve as cover surfaces for the assembly to protect the information storage unit. The outer surface of the index members 90 and 92 may contain title or classification information, referred to hereinbefore.

Figure 21:
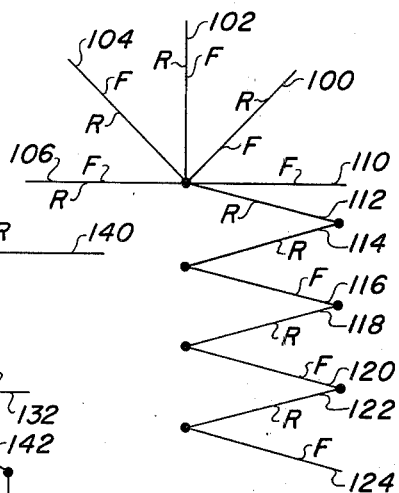
FIG. 21 is a side elevation schematic view illustrating an alternative embodiment of an information storage unit in accordance with the invention and having a plurality of microform members and a plurality of associated index members which are intercoupled in a pleated configuration.

A further embodiment of an information storage unit in accordance with the invention which includes a plurality of microform information storage members and a plurality of associated index members for use with both forward and rearward projection apparatus is illustrated in FIG. 21. In this arrangement, the microform members 100, 102, 104 and 106 are pivotally intercoupled with an index member 110 while the index members 112, 114, 116, 118, 120, 122 and 124 are intercoupled with each other in a pleating manner and are coupled to the microform members through the index member 112 at the common coupling edge of the microform members. The microform and index members can be rotated and aligned so that a microform member and its adjacent index member are orientated in a same plane in predetermined alignment for viewing with a forward or rearward projection apparatus. Various members of microform members and index members can be associated in the manner indicated in FIG. 21 provided that index indicia for forward or rearward projection of the most rearward microform (i.e. 106) is located on a surface of the index member 124 which is positioned furthermost on the array from the edge coupling index member 112, and, that index indicia for forward or rearward projection of the rearmost microform is also located on a surface of the edge coupling member 112. The following Table III lists exemplary microform members and its associated index members or the storage unit of FIG. 21 which are orientated together in a same plane for viewing in a forward or rearward projection apparatus.

Figures 23, 24:
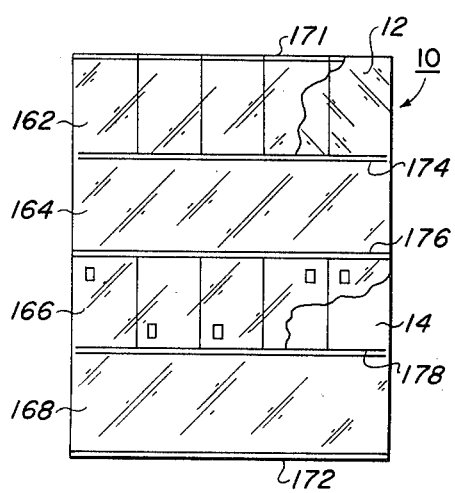
FIG. 23 is a plan view of an information storage unit in accordance with this invention and adapted for supplementing and amending the microform stored information and associated index information.
FIG. 24 is a side elevational view of the information storage unit of FIG. 23.

At times it may be desirable to supplement or amend the information stored in an information storage unit constructed in accordance with features of this invention. FIGS. 23 and 24 illustrate an arrangement adapted for effecting this amending or supplementation of information both to the microform member and to the index member. FIG. 23 illustrates an information unit 10 which is segregated into pockets 162, 164, 166 and 168. The unit is formed by transparent thin sheets 169 and 170 which are secured together across the width of the unit at outer edges 171 and 172 and along inner surfaces 174, 176 and 178. The sheets are formed of Mylar or polystyrene for example, and the pockets are adapted to receive microform member strips which amend or supplement the information contained in the information storage unit. Amending and supplementing the information in a microform member will be accompanied by a similar amending or supplementation of indicia in the index member.

Thus, an improved microform information storage unit has been described which advantageously provides for random access to information stored on a microform member of the unit. The information storage unit of the invention further advantageously provides for the storage of large bodies of information and for use of the microform member of the unit and its associated index member with both forward and rearward projecting apparatus.

While I have described and illustrated particular embodiments of my invention, it will be understood that various modifications may be made therein without departing from the spirit of the invention and the scope of the appended claims.

What is claimed is:

1. In combination, a microform viewing apparatus for holding and displaying a microform, said apparatus including reference means secured thereto; and a microform information storage unit including a plurality of generally flat microform information storage members having information recorded thereon in predetermined discrete areas of the members, said information storage members pivotally coupled along a common edge to an edge of a first body; a plurality of generally flat index members coupled with said microform storage members in predetermined alignment with said microform members, said index members integrally coupled along a common edge to an opposite edge of said first body whereby said index members and said microform members are adapted to be folded about the coupling edges; said index members having recorded thereon in predetermined discrete areas visible indicia to identify corresponding recorded information on said storage members, said indicia lying on said index members in substantially the same geometric array as said corresponding recorded information lies on said storage members, said index members oriented with respect to said recorded information for displaying and

TABLE III

| Microform Member | 100F | 100R | 102F | 102R | 104F | 104R | 106F | 106R |
|---|---|---|---|---|---|---|---|---|
| Index Member | 110F | 114R | 116F | 118R | 120F | 122R | 124F | 112R |

Figure 22:
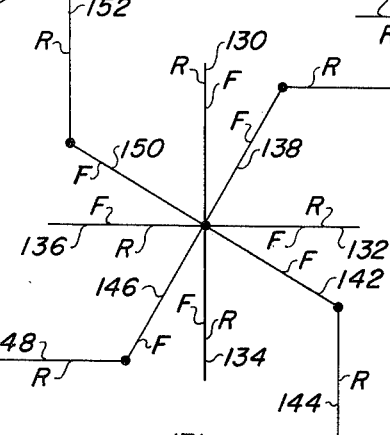
FIG. 22 is a side elevation schematic view illustrating an alternative embodiment of an information storage unit of the present invention.

A further embodiment of a microform information storage unit having a plurality of microform storage members and associated index members for use with forward and rearward projection reading apparatus is illustrated in FIG. 22. In this embodiment, microform members 130, 132, 134 and 136 are intercoupled at a common edging while index members 134, 142, 146, and 150 are similarly coupled to this common edging. Additionally, each of these index members includes a second index member pivotally coupled to an outer edge thereof. The index members 140, 144, 148 and 152 are pivotally coupled to the index members 138, 142, 146 and 150 respectively. The pivotally coupled index members can be folded over and aligned with an associated microform member to provide the desired orientation of the microform and index member for reading in either a forward or rearward type production reading apparatus. Table IV following illustrates the orientation of a microform member and its associated index member for reading.

TABLE IV

| Microform Member | 130F | 130R | 132F | 132R | 134F | 134R | 136F | 136R |
|---|---|---|---|---|---|---|---|---|
| Index Member | 138F | 152R | 140R | 142F | 146F | 144R | 150F | 148R | viewing particular information on said storage members when indicia on a particular index member relating to particular information on a microform storage member corresponding to said particular index member is aligned with said reference means on the microform viewing apparatus, said particular index member and corresponding microform storage member being rotated and aligned in substantially the same plane for viewing with said viewing apparatus.

2. The combination of claim 1 wherein said first body comprises an index member having indicia formed thereon.

3. The combination of claim 1 including a sheet of protective material positioned between said microform members for inhibiting damage to said members.

* * * * *